(12) United States Patent
Okuno

(10) Patent No.: US 6,397,471 B1
(45) Date of Patent: Jun. 4, 2002

(54) CAGE ASSEMBLING APPARATUS

(75) Inventor: Hiroyuki Okuno, Shiga (JP)

(73) Assignee: NSK, Ltd., Tokyo (JP)

( * ) Notice: Subject to any disclaimer, the term of this patent is extended or adjusted under 35 U.S.C. 154(b) by 0 days.

(21) Appl. No.: 09/471,147

(22) Filed: Dec. 23, 1999

(30) Foreign Application Priority Data

Dec. 25, 1999 (JP) .......................................... 10-370927

(51) Int. Cl.⁷ .............................................. B21D 53/10
(52) U.S. Cl. ............................ 29/898.064; 29/898.06; 29/898.061; 29/898.062; 29/724
(58) Field of Search ....................... 29/898.06, 898.061, 29/898.062, 898.064, 809, 817, 818, 724, 725

(56) References Cited

U.S. PATENT DOCUMENTS

| | | | |
|---|---|---|---|
| 924,440 A | * | 6/1909 | Dowell |
| 1,627,965 A | * | 5/1927 | Gamble |
| 2,311,251 A | * | 2/1943 | Rees et al. |
| 2,407,016 A | * | 9/1946 | Kalister et al. |
| 3,533,151 A | * | 10/1970 | Gaudry |
| 4,006,945 A | * | 2/1977 | Sekerich |
| 5,404,642 A | * | 4/1995 | Alling et al. .......... 29/898.064 |

FOREIGN PATENT DOCUMENTS

| | | | | |
|---|---|---|---|---|
| EP | 0 894992 A1 | 2/1999 | ........... | F16C/43/06 |
| GB | 2173263 A | 10/1986 | ........... | F16C/43/06 |
| JP | 55-031522 | * | 3/1980 | .................. 29/724 |
| JP | 58-034724 | * | 3/1983 | |
| JP | 05-018420 | * | 1/1993 | |
| JP | 10-118858 | * | 5/1998 | |

\* cited by examiner

Primary Examiner—S. Thomas Hughes
Assistant Examiner—Eric Compton
(74) Attorney, Agent, or Firm—Sughrue Mion, PLLC (57) ABSTRACT

The apparatus incorporates a base member 11 for supporting a cage 3 and a rolling-element distributing column 13 disposed concentrically to the cage 3 supported by the base member 11 and permitted to relatively rotate with respect to the base member 11. An opening 28 of a rolling-member supply passage 29 in which a plurality of the rolling elements 5 are loaded in a line is formed at an end of the rolling-element distributing column 13 opposite to the cage 3, and a pressing surfaces 27 or 31 is formed which forcibly introduces the rolling elements 5 supplied through the opening 28 into the pockets 7 by using relative rotation between the base member 11 and the rolling-element distributing column 13.

4 Claims, 13 Drawing Sheets

CAGE ASSEMBLING APPARATUS

BACKGROUND OF THE INVENTION

1. Field of the Invention

The present invention relates to a cage assembling apparatus for installing rolling elements in an angular-type or crown-type cage which holds the rolling elements, which does not use the outer race and the inner race of a rolling bearing as holding and constitutional members and which independently holds the rolling elements.

2. Description of the Related Art

A ball bearing, which is a roll bearing, has a structure that a plurality of balls, which are rolling elements, are inserted between the outer race and an inner race so that the load of a shaft is supported by rolling contact. At this time, the plural balls are held in a cage to prevent contact among the plural balls and separation of the ball from the space between the outer race and the inner race. The cage is made of flexible synthetic resin or the like and provided with a plurality of annular pockets arranged to hold the balls such that rolling of the balls is permitted and formed in the circumferential direction of the cage.

The balls have been installed in the cage by simultaneously installing the balls or by sequentially installing the balls. That is, when the plural balls are simultaneously installed, the balls which must be installed are distributed to corresponding pockets of the cage. Then, all of the balls or a plurality of the balls are simultaneously installed or a plurality of installing operations are performed. When the balls are sequentially installed, the position of the pocket is detected. Then, the ball is installed in the detected pocket. The foregoing operation is sequentially repeated so that the balls are installed in all of the pockets of the cage.

However, when a plurality of the balls are simultaneously installed in the cage, at least two operating units are required which include a motor for operating a ball distributing mechanism or a substitutional operating unit and a ball introducing cylinder or a substitutional actuator. Since the ball distributing mechanism and the introducing mechanism are independently required, the apparatus becomes too complicated and size reduction is not permitted. Therefore, there arises a problem in that the cost of the apparatus cannot be reduced. Since a plurality of the balls are installed, the cage must bear great elastic deformation. Thus, there is apprehension that damage of the cage occurs.

When the balls are sequentially installed, a motor for a mechanism (an index table) for indexing the position of the pocket, a motor for rotation and a cylinder or an actuator for performing the installing operation are required. Similarly to the foregoing case, at least two operating units are required. Therefore, there arises a problem in that the apparatus becomes too complicated and the cost of the apparatus cannot be reduced. In the foregoing case, a cycling operation including rotation, stoppage and installation must be performed by the number corresponding to the number of the balls. Therefore, there arises a problem in that long time is required to complete the installing operation.

SUMMARY OF THE INVENTION

In view of the foregoing, an object of the present invention is to provide a cage assembling apparatus which is capable of successively installing a plurality of rolling elements in cages and simplifying the structure of the apparatus and shortening time required to complete an installing operation.

To achieve the foregoing object, according to the present invention, there is provided a cage assembling apparatus for installing rolling elements in a plurality of pockets which have flexibility, which are arranged to hold rolling elements such that rolling of the rolling elements is permitted and which are provided for an annular cage in a circumferential direction of the cage. The cage assembling apparatus comprises: a base member for supporting the cage; and a rolling-element distributing column disposed concentrically to the cage supported by the base member and permitted to relatively rotate with respect to the base member. An opening of a rolling-member supply passage in which a plurality of the rolling elements are loaded in a line is formed at an end of the rolling-element distributing column opposite to the cage, and a pressing surface is formed which forcibly introduces the rolling elements supplied through the opening into the pockets by using relative rotation between the base member and the rolling-element distributing column.

In the cage assembling apparatus, the base member or the rolling-element distributing column is rotated so that the rolling element supplied from the rolling-element supply passage is pressed against the pressing surface so as to be forcibly introduced into the pocket of the cage. Since the rotating operation is performed, the plural rolling elements are sequentially installed in all of the pockets. As a result, distribution of the rolling elements to the plural pockets and installation of the rolling element in each pocket which have individually been performed can simultaneously be performed by only rotating the base member or the rolling-element distributing column. As a result, the operation can be completed by only one motor. Moreover, the assembling cycle including the step of distributing the rolling elements and that of forcibly introducing the same can considerably be shortened.

In the cage assembling apparatus, the pressing surface may be constituted by an axial-directional pressing surface for pressing the rolling elements in a direction of the axis of the rolling-element distributing column to forcibly introduce the rolling elements into the pocket and/or a radial-directional pressing surface for pressing the rolling elements in the radial direction of the rolling-element distributing column to forcibly introduce the rolling elements into the pocket.

The foregoing cage assembling apparatus permits a direction in which the rolling element is forcibly introduced into the pocket to be an axial direction of the rolling-element distributing column, the radial direction of the rolling-element distributing column or a direction inclined from the axial direction. The reason for this lies in that the axial-directional pressing surface and/or the radial-directional pressing surface is selected so as to be used. Thus, the forcible introduction of the rolling element can be performed in any one of the foregoing directions.

In the cage assembling apparatus, the radial-directional pressing surface may be a pressing surface which outwards presses the rolling element in the radial direction of the rolling-element distributing column.

The foregoing cage assembling apparatus has the structure that the rolling element supplied to the inside portion of the annular cage is outwards pressed in the radial direction by the pressing surface of the rolling-element distributing column so as to forcibly be introduced from the inside portion of the cage into the pocket.

In the cage assembling apparatus, the radial-directional pressing surface may be a pressing surface which inwards pressing the rolling element in the radial direction of the rolling-element distributing column.

The foregoing cage assembling apparatus is structured such that the rolling element supplied to the outside of the annular cage is inwards pressed in the radial direction by the pressing surface of the rolling-element distributing column so as to forcibly be introduced from the outside portion of the cage into the pocket.

DETAILED DESCRIPTION OF THE PREFERRED EMBODIMENTS

Preferred embodiments of a cage assembling apparatus according to the present invention will now be described with reference to the drawings.

[First Embodiment]

Figure 1:
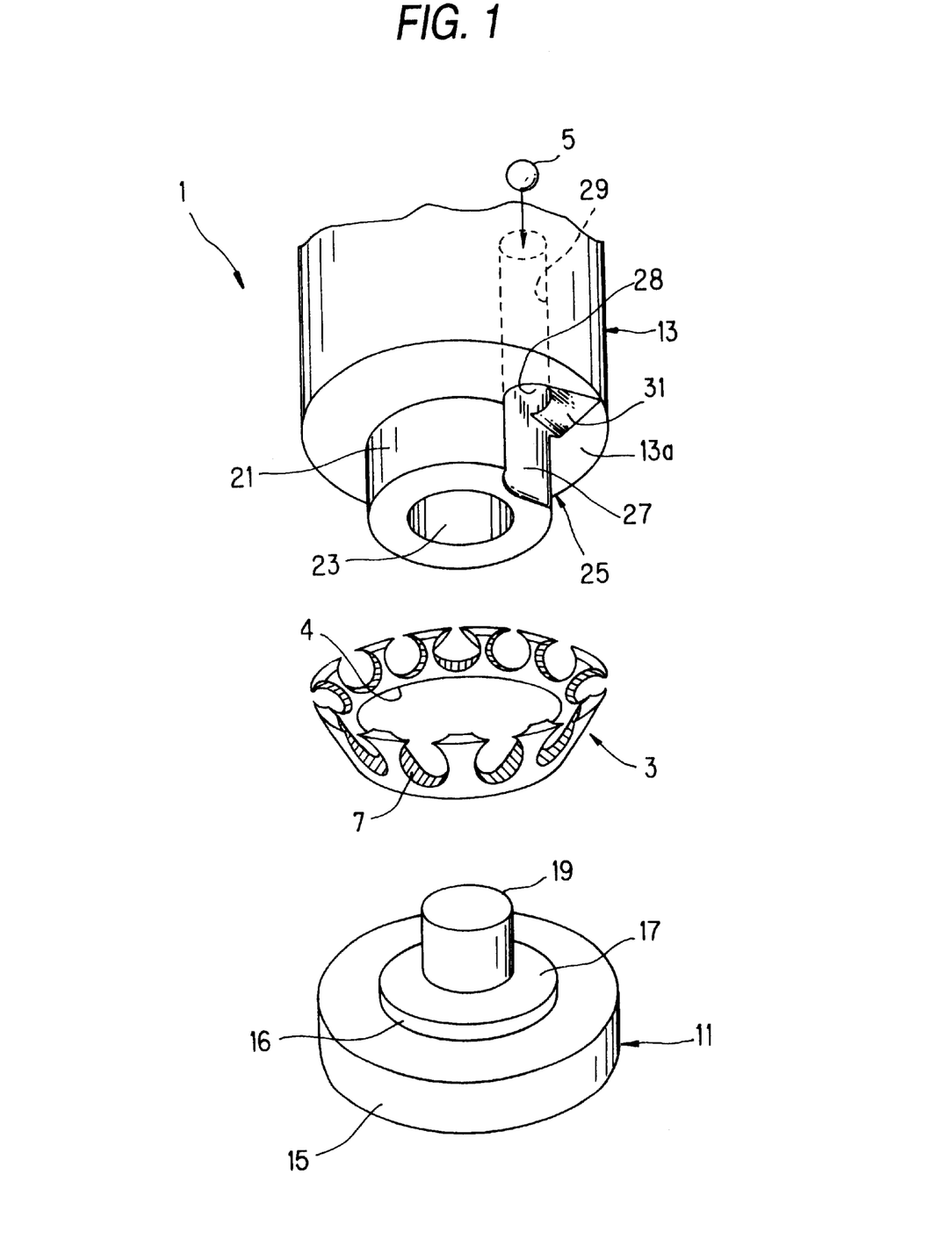
FIG. 1 is an exploded perspective view showing a first embodiment of a cage assembling apparatus according to the present invention together with a cage and a rolling element.
Figure 2:
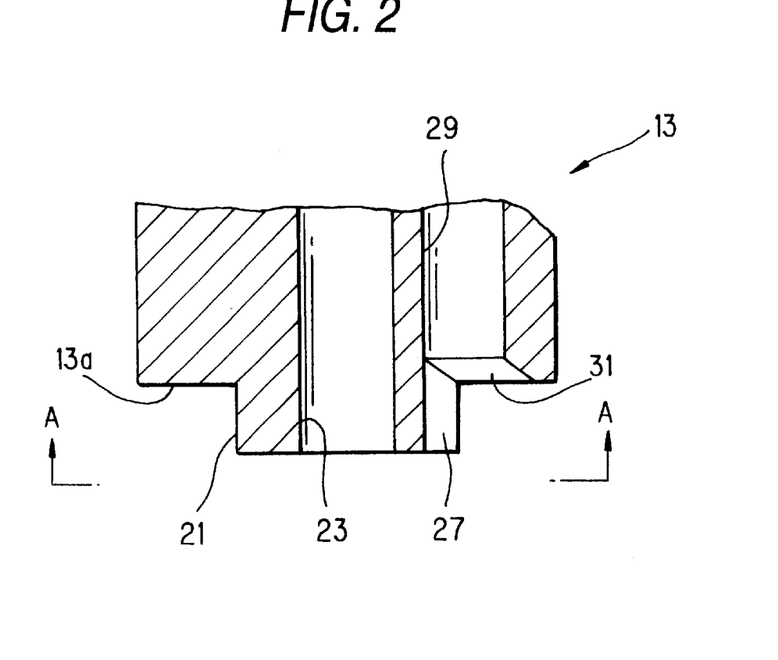
FIG. 2 is a cross sectional view showing a rolling-element distributing column.
Figure 3:
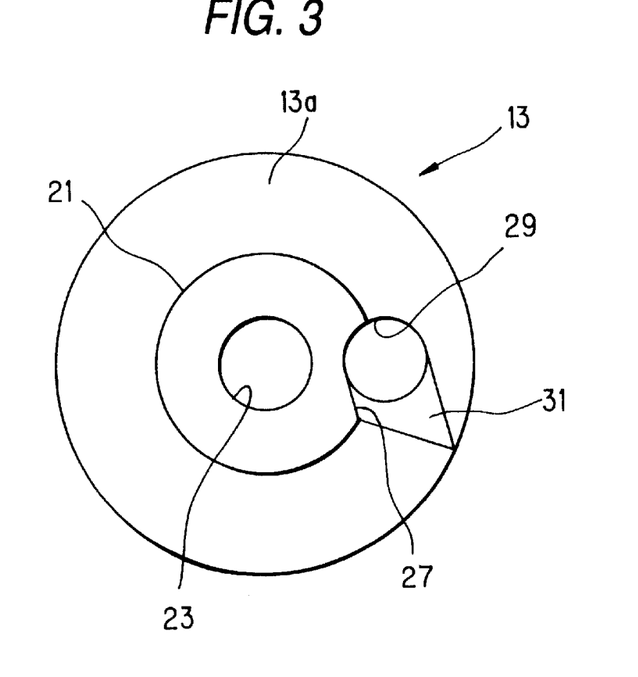
FIG. 3 is a cross sectional view taken along a line indicated with arrows A—A shown in FIG. 2.

Referring to FIGS. 1 to 3, a cage 3 which is assembled by using a cage assembling apparatus 1 according to this embodiment is made of, for example, synthetic resin having flexibility. The cage 3 is formed into an annular cone shape. A plurality of pockets 7 capable of rollably holding rolling elements (balls) 5 are provided for the cage 3 in the circumferential direction of the cage 3. When the ball 5 is forcibly introduced, the pocket 7 is elastically deformed in a direction in which the diameter of the opened portion is enlarged. After the ball 5 has forcibly been introduced into the pocket 7, the pocket 7 is elastically deformed so that the diameter of the opened portion of the pocket 7 is reduced to hold the ball 5 such that separation of the ball 5 is prevented and rolling of the same is permitted. As described later, the shape of the cage 3 is not limited to the foregoing shape.

The cage assembling apparatus 1 incorporates a base member 11 and a rolling-element distributing column 13, which are disposed to sandwich the cage 3. The body 15 of the base member 11 is formed into a cylindrical shape. A circular seating surface which is concentric to the body 15 and allowed to project over the upper surface of the body 15 is formed on an end surface (the upper surface) of the body 15. The seating surface serves as a support surface 17. A shaft 19 is erected concentrically on the upper surface of the support surface 17. The base member 11 supports the cage 3 such that the axis of the cage 3 is perpendicular to the support surface 17 by engaging the inside portion 4 of the cage 3 to the outside portion 16 of the support surface 17.

The rolling-element distributing column 13 is formed into a cylindrical shape. A concentric cylindrical portion 21 is formed to project over an end (a lower portion) of the rolling-element distributing column 13. The cylindrical portion 21 has a bearing hole 23 formed concentrically. The bearing hole 23 is rotatively engaged to a shaft 19 of the base member 11. That is, the rolling-element distributing column 13 having the bearing hole 23 engaged to the shaft 19 is disposed concentrically to the cage 3 supported by the base member 11, so that relative rotation with respect to the base member 11 is permitted.

A cut portion 25 is formed by inwardly cutting the outer portion of the cylindrical portion 21 in the radial direction. A cut surface (a surface paralleling the axis of the cylindrical portion 21) of the cut portion 25 serves as a radial-directional pressing surface 27.

A rolling-element supply passage 29 penetrating the rolling-element distributing column 13 in the axial direction is provided for the rolling-element distributing column 13. The rolling-element supply passage 29 has an inner diameter which is substantially the same as the outer diameter of the ball 5 so as to accommodate a plurality of the balls 5 in a line. An end of the rolling-element supply passage 29 is opened in the upper surface of the rolling-element distributing column 13, while another end of the same is formed into an opening 28 opened in a cut portion 25 in the lower surface of the rolling-element distributing column 13. That is, the balls 5 loaded into the rolling-element supply passage 29 are supplied to the cut portion 25 through the opening 28.

The lower surface of the rolling-element distributing column 13 is provided with an axial-directional pressing surface 31 formed into an inclined surface by cutting a portion of the annular surface 13a except for the cylindrical portion 21 toward the rolling-element supply passage 29 such that a cutting thickness is gradually increased.

A mechanism for operating the cage assembling apparatus 1 according to this embodiment will now be described.

Figure 4:
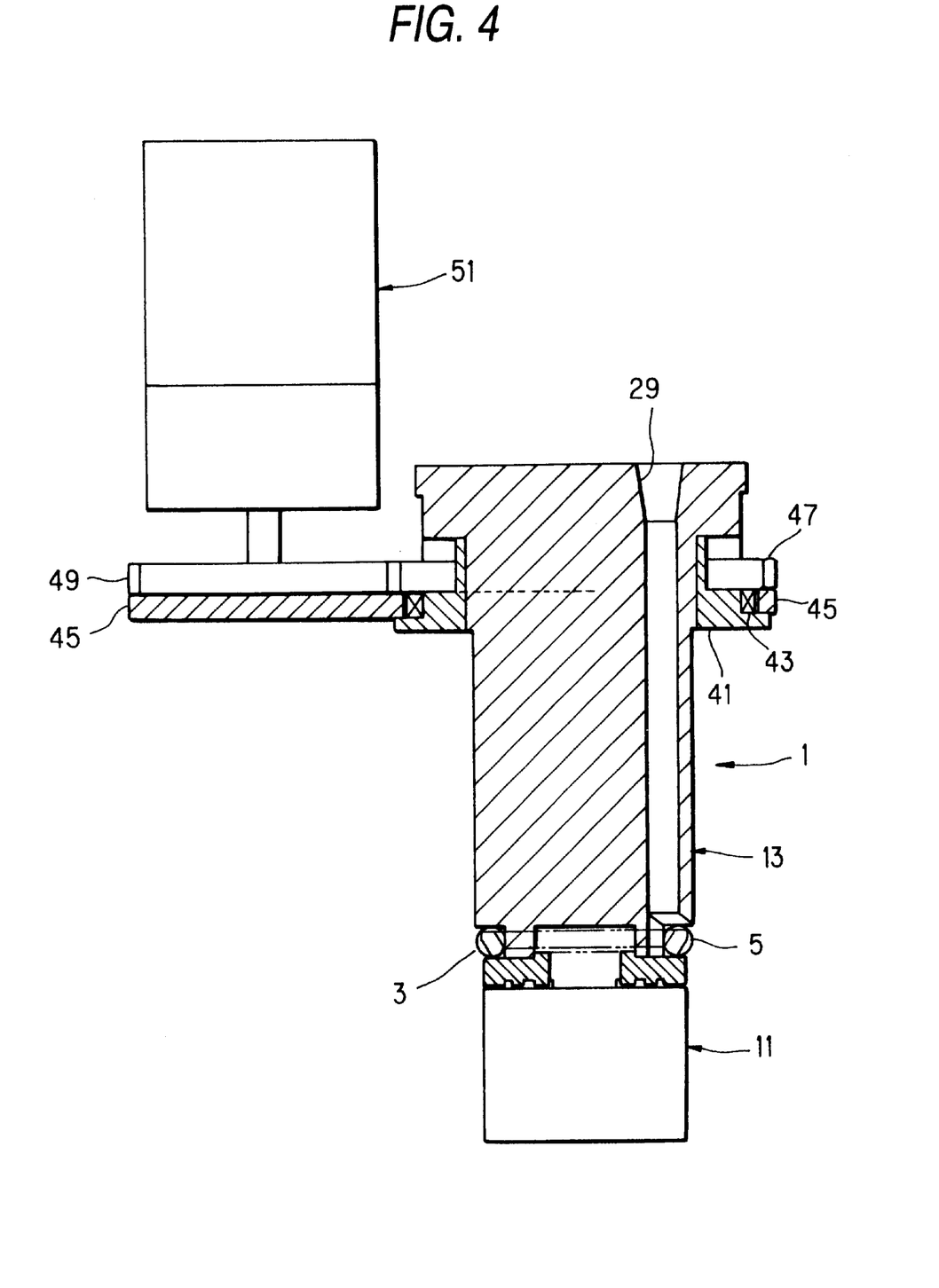
FIG. 4 is a side view showing a mechanism for operating the cage assembling apparatus according to this embodiment.

In FIG. 4, an annular flange 41 is joined to the outer surface of the rolling-element distributing column 13. The outer surface of the flange 41 is rotatively supported by a support portion 45 through a bearing 43. The support portion 45 is secured to a base (not shown). A follower gear 47 is joined to the outer surface of the upper portion of the support portion 45 of the flange 41. A drive gear 49 is engaged to the follower gear 47. The drive gear 49 is rotated by an operating unit (a motor) 51 having a reducing unit.

The base member 11 and the rolling-element distributing column 13 approach/move away from each other in the axial direction. The cage 3 is joined to the support surface 17 of the base member 11 in a state in which the rolling-element distributing column 13 and the base member 11 are separated from each other. When the base member 11 and the rolling-element distributing column 13 are engaged to each other, the cage 3 joined to the support surface 17 is held between the base member 11 and the rolling-element distributing column 13. It is preferable that the outer surface of the cage 3 is held by a rotation stopper, such as a three-claw air chuck or the like (not shown), so that rotation of the cage 3 is inhibited.

The operation of the cage assembling apparatus 1 structured as described above will now be described.

Figure 5:
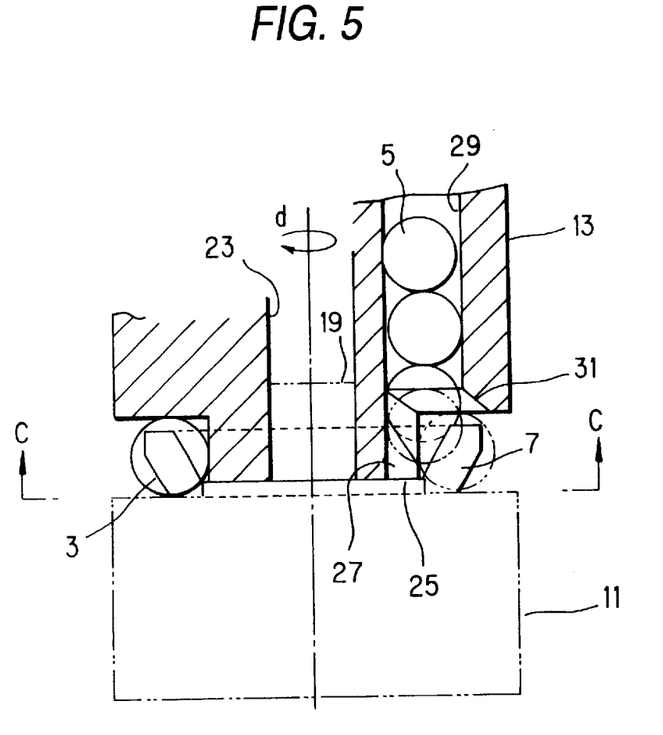
FIG. 5 is a side view showing a state of the cage assembling apparatus according to the first embodiment in which a ball is being introduced.
Figure 6:
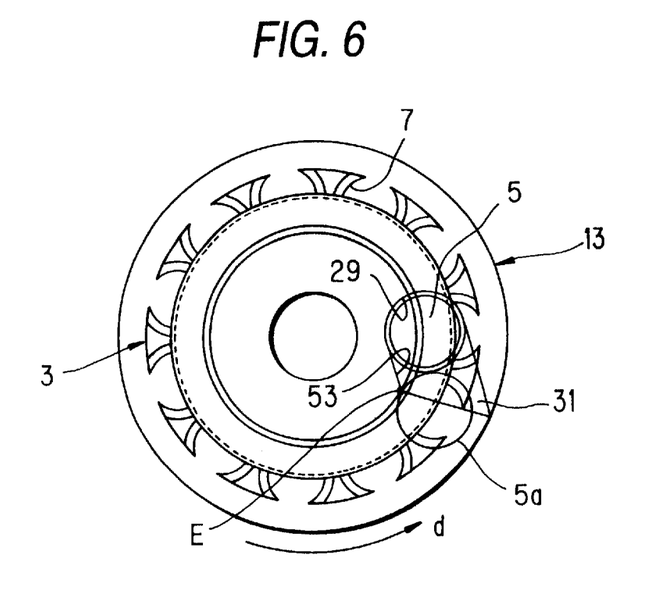
FIG. 6 is a cross sectional view taken along a line indicated with arrows C—C shown in FIG. 5.

FIG. 5 is a side view showing a state of the cage assembling apparatus according to the first embodiment in which the balls are loaded. FIG. 6 is a cross sectional view taken along a line incidated with arrows C—C shown in FIG. 5.

The cage 3 is joined to the base member 11. The base member 11 and the rolling-element distributing column 13 are joined to each other by inserting the shaft 19 into the bearing hole 23. Balls 5, the number of which is the same as that of the pockets 7, have been loaded into the rolling-element supply passage 29 of the rolling-element distributing column 13. Therefore, the lowest ball 5 has been supplied to the cut portion 25.

When the rotating means 51 is rotated in the foregoing state, the follower gear 47 is rotated by the drive gear 49. Thus, the rolling-element distributing column 13 is rotated in a direction indicated with an arrow d. After the rolling-element distributing column 13 has been rotated, the ball 5 is outwardly pressed by the radial-directional pressing surface 27. Moreover, the ball 5 is downwardly pressed by the axial-directional pressing surface 31. Therefore, the ball 5 elastically deforms the opening of the pocket 7 to enlarge the diameter of the pocket 7. Thus, the ball 5 is forcibly introduced into the pocket 7.

Since the lowest ball 5 has forcibly been introduced into the pocket 7, a next ball 5 is moved downwards to the lowest position. Then, the rolling-element distributing column 13 is rotated so that the ball 5 is similarly pressed by the radial-directional pressing surface 27 and the axial-directional pressing surface 31 so as to forcibly be introduced into a next pocket 7. A similar operation is repeated so that the rolling-element distributing column 13 is rotated one time. Thus, all of the ball 5 are distributed and installed in all of the pockets 7.

The dimensional relationship among the rolling-element supply passage 29, the radial-directional pressing surface 27 and the axial-directional pressing surface 31 will now be described with reference to FIGS. 7 to 11.

Figure 7:
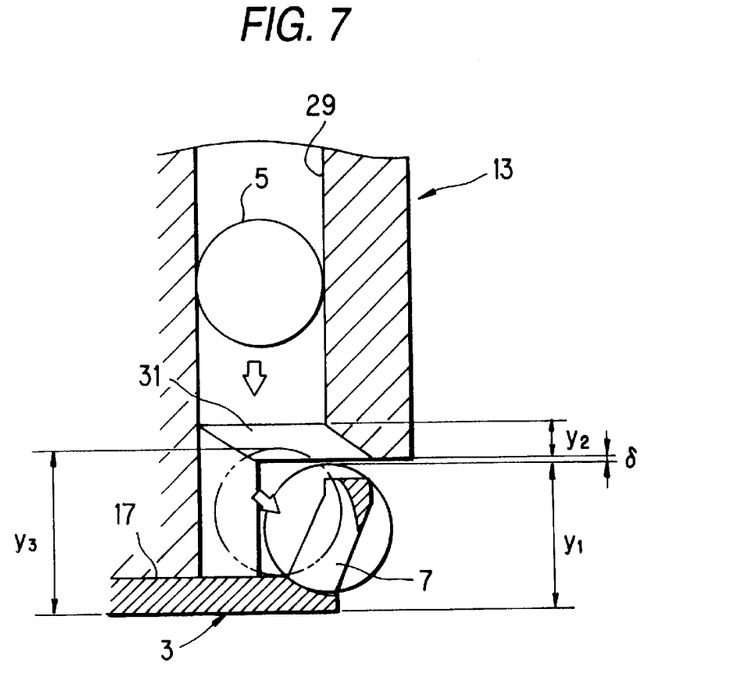
FIG. 7 is a diagram for defining the height of an axial-directional pressing surface.

As shown in FIG. 7, the height y2 of the axial-directional pressing surface 31 must be defined as follows: the ball 5 and the pressing surface 31 have been brought into contact with each other in a state (indicated with an alternate long and two dashes line) where the ball 5 has been dropped and placed on the support surface 17, and the contact between the ball 5 and the pressing surface 31 is inhibited after the ball 5 has forcibly been introduced into the pocket 7. Therefore, assuming that

- y1: height of the top end of a ball held in the pocket from the upper surface of the base member
- y2: height of the axial-directional pressing surface
- y3: height of the top end of the ball from the upper surface of the base member when the ball has been placed on the support surface 17
- δ: clearance (gap for preventing interference), y2 must be defined to satisfy the following relationship:

$$y3 \leq y1 + y2 + \delta$$

That is, $$y2 \geq y3 - y1 - \delta \tag{1}$$

Figure 8:
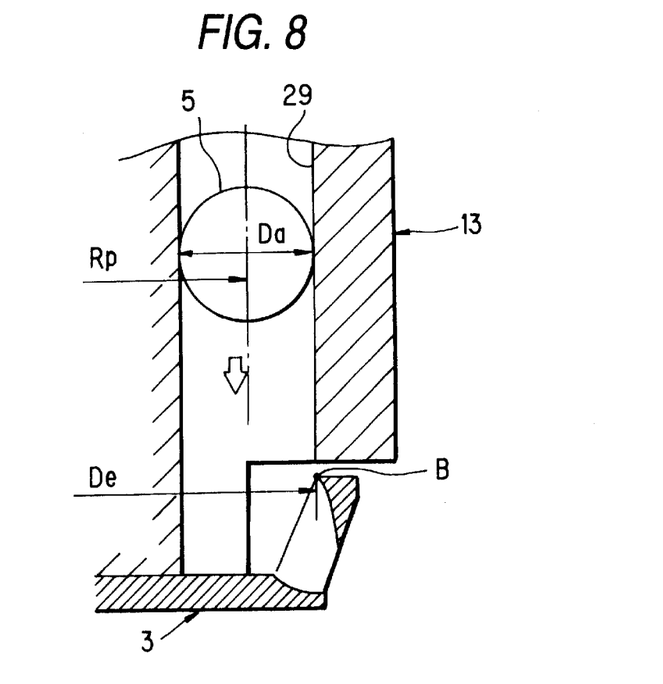
FIG. 8 is a diagram for defining the position of a rolling-element supply passage.

As shown in FIG. 8, the rolling-element supply passage 29 must permit the ball 5 to smoothly be dropped without any contact with the upper end surface B of the cage 3. Therefore, assuming that

- Rp: radius of the center of the rolling-element supply passage
- De: diameter of upper end surface B
- Da: diameter of ball, Rp must be defined to satisfy the following relationship:

$$Rp \leq (De - Da)/2 \tag{2}$$

Figure 9:
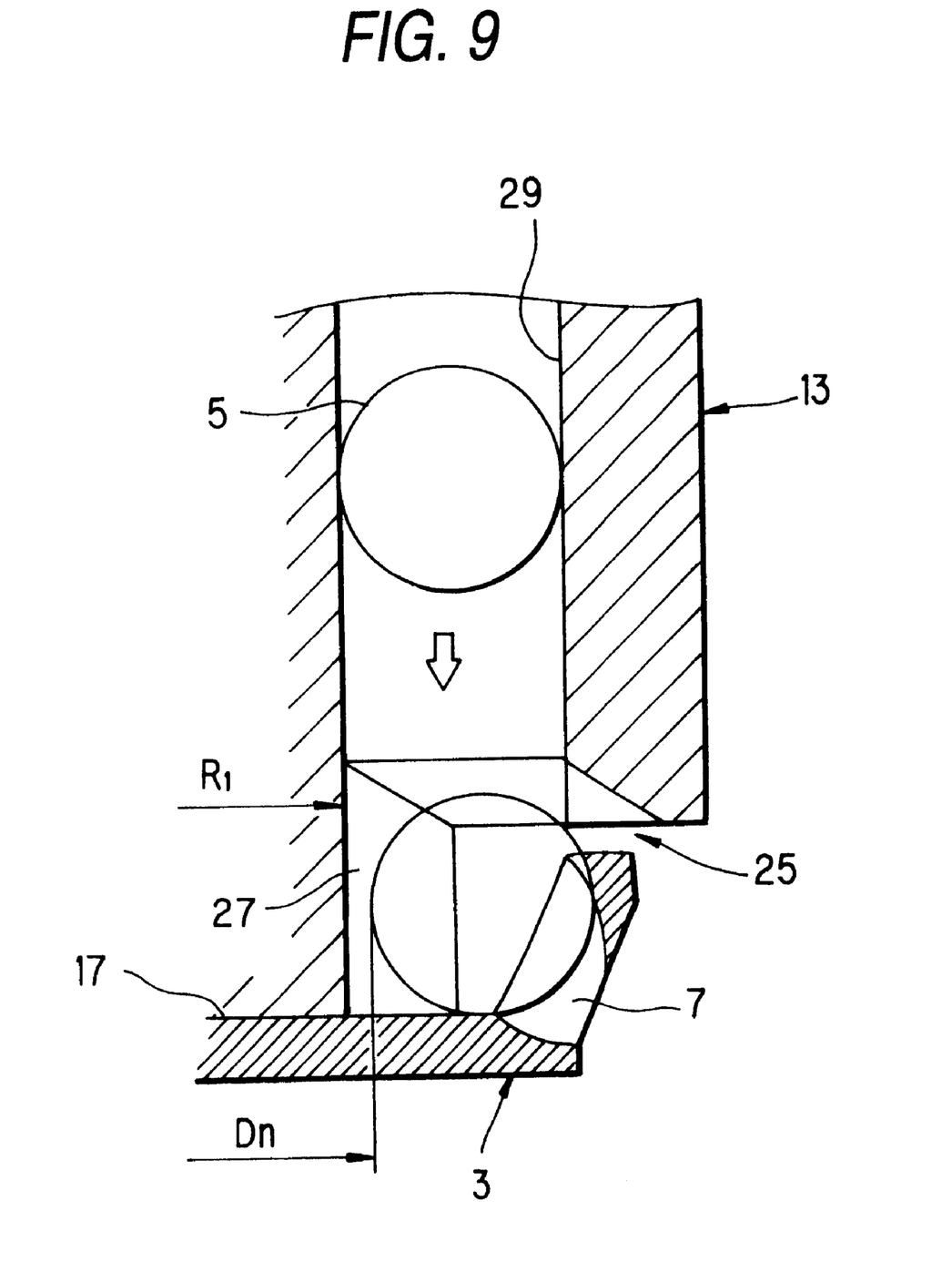
FIG. 9 is a diagram for defining a minimum radius of a radial-directional pressing surface.

To permit the ball 5 to be drooped to the cut portion 25 and to be placed on the support surface 17 as shown in FIG. 9, the minimum radius of the radial-directional pressing surface 27 must be not larger than a predetermined size. That is, if the minimum radius of the radial-directional pressing surface 27 is larger than the predetermined size, the ball 5 cannot be dropped. Therefore, assuming that

- R1: minimum radius of the radial-directional pressing surface
- Dn: inscribed diameter of ball immediately before ball is brought into contact with pocket so as to forcibly be introduced, Ri must be defined to satisfy the following relationship:

$$R1 \leq Dn/2 \tag{3}$$

Figure 10:
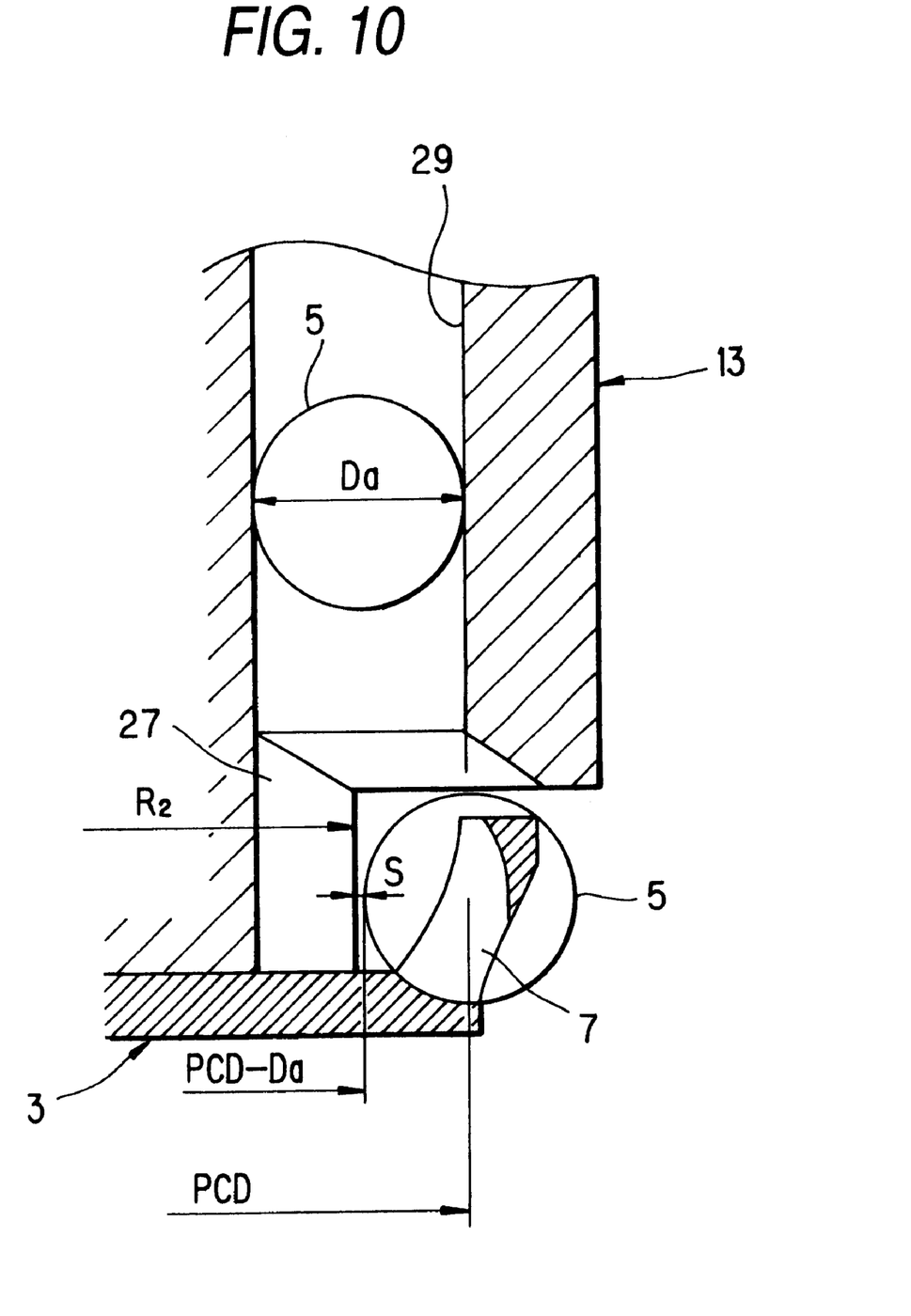
FIG. 10 is a diagram for defining a minimum radius of the radial-directional pressing surface.

As shown in FIG. 10, contact of the ball 5 held in the pocket 7 with the radial-directional pressing surface 27 must be inhibited when the rolling-element distributing column 13 has been rotated. It is preferable that gap s is maintained between the ball 5 and the radial-directional pressing surface 27 at this time. Therefore, assuming that

- R2: maximum radius (that is, the radius of cylindrical portion 21) of the radial-directional pressing surface,
- PCD: distance between centers of balls held in pockets, R2 must be defined to satisfy the following relationship:

$$R2 < (PCD - Da)/2 \tag{4}$$

If the ball 5 is not forcibly introduced into the final position by the radial-directional pressing surface 27, the elastic force of the pocket 7 causes the ball 5 to be introduced into the pocket 7. That is, when the diameter of the ball 5 has allowed to pass through the opening of the pocket 7, the diameter of the opening of the pocket is reduced along the curved surface of the ball 5. Thus, the ball 5 is introduced into the pocket 7.

Figure 11:
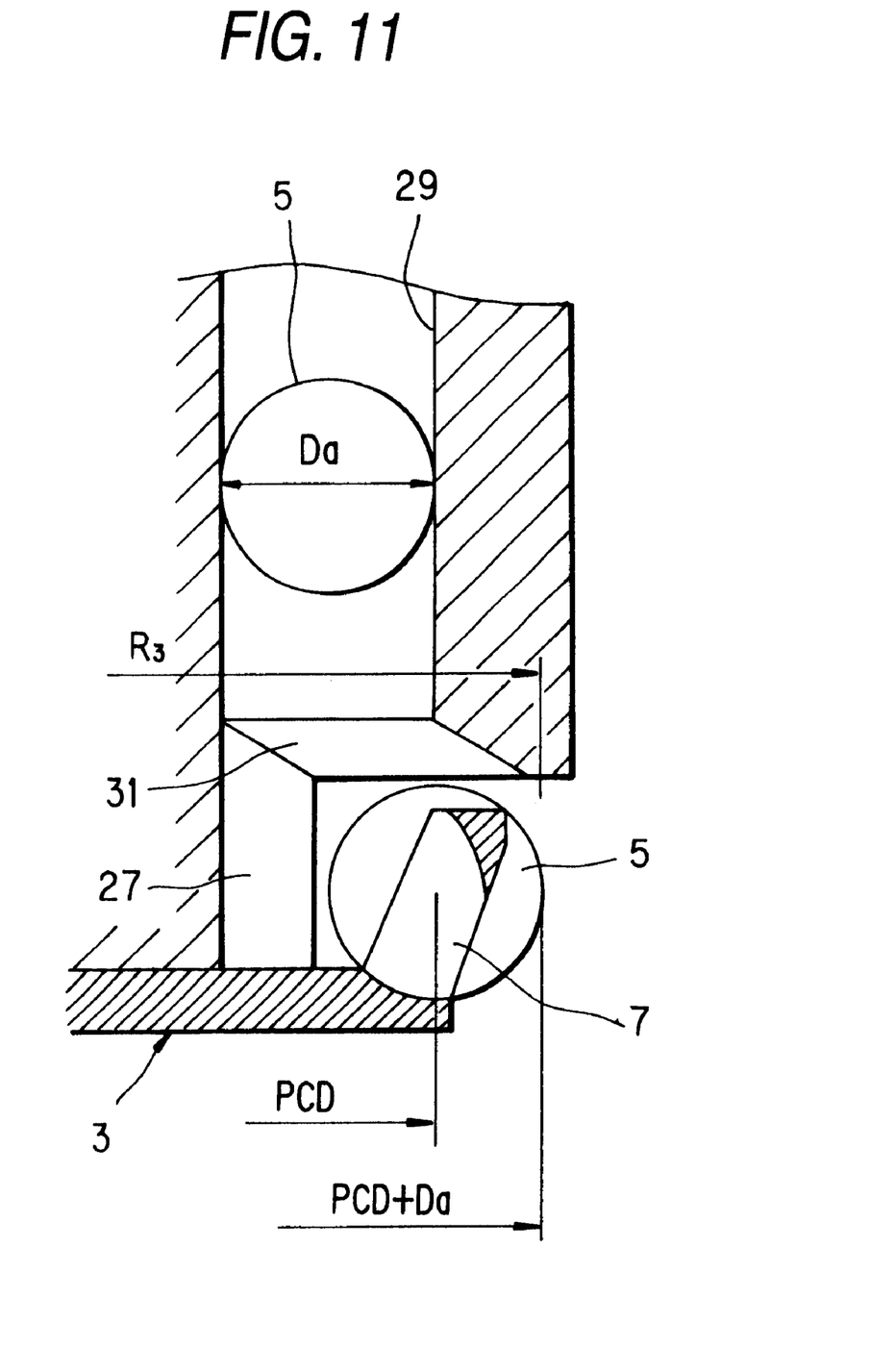
FIG. 11 is a diagram for defining a maximum radius of the axial-directional pressing surface.

As shown in FIG. 11, the axial-directional pressing surface 31 must continuously press the ball 5 after introduction of the ball 5 into the pocket 7 has been started and the ball 5 has been moved to the outside in the radial direction. Therefore, the maximum radius of the axial-directional pressing surface 31 must be not smaller than a predetermined value. Therefore, assuming that R3: maximum radius of the axial-directional pressing surface, it is preferable that R3 is defined to satisfy the following relationship:

$$R3 > PCD/2 \quad (5).$$

It is preferable that the radial-directional pressing surface 27 is, as shown in FIG. 6, constituted by a tangent line 53 of a circumference of the rolling-element supply passage 29 which is in contact with vertex E of a ball 5a which is a vertex of an inscribed circuit, the ball 5a being positioned adjacent to the ball 5 in a lowest portion 25.

As described above, the above-mentioned cage assembling apparatus 1 is arranged such that the rolling-element distributing column 13 is rotated. Thus, the ball 5 supplied through the rolling-element supply passage 29 is pressed by the radial-directional pressing surface 27 and the axial-directional pressing surface 31 so as to forcibly be introduced into the pocket 7 of the cage 3. The foregoing rotation causes the plural balls 5 to sequentially be installed in all of the pockets 7. Thus, distribution of the balls 5 to the plural pockets 7 and installation of the ball 5 to each pocket 7 which have individually been performed with the conventional structure can simultaneously be performed by only rotating the rolling-element distributing column 13. Therefore, the operation can be performed by only one motor 51. Moreover, the assembling cycle including the distribution step and the step for forcibly installing the balls 5 can considerably be shortened. Since the balls 5 are forcibly introduced in the continuous and sequential manner, the cage 3 is not required to bear great elastic deformation. Moreover, damage of the cage 3 can be prevented.

[Second Embodiment]

A second embodiment of the cage assembling apparatus according to the present invention will now be described.

Figure 12:
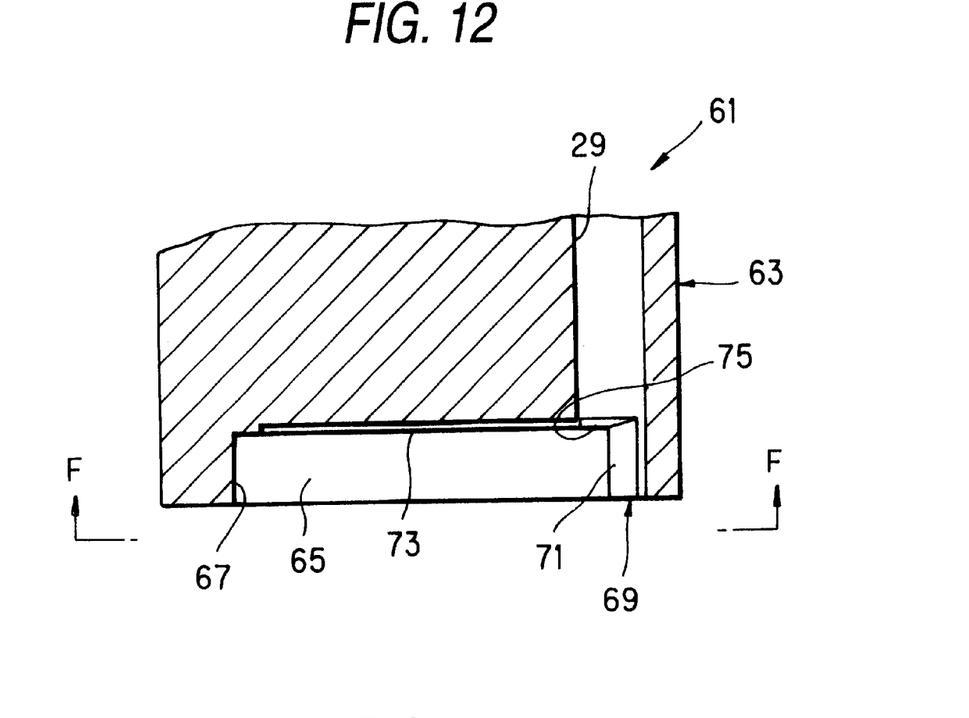
FIG. 12 is a cross sectional view of a rolling-element distributing column for use in a second embodiment of the cage assembling apparatus according to the present invention.
Figure 13:
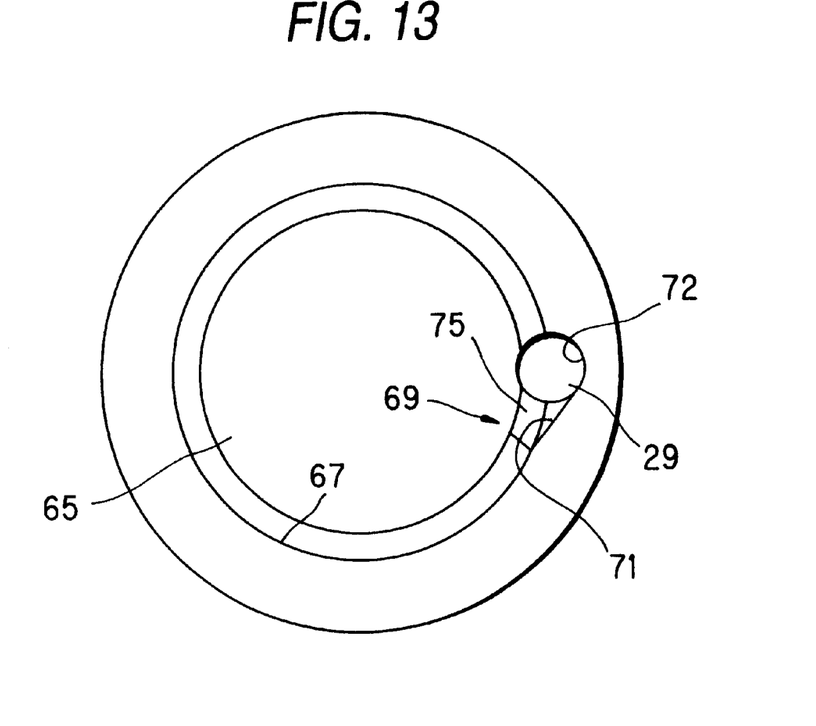
FIG. 13 is a cross sectional view taken along a line indicated with arrows F—F shown in FIG. 12.

FIG. 12 is a cross sectional view showing a rolling-element distributing column for use in a second embodiment of the cage assembling apparatus according to the present invention. FIG. 13 is a cross sectional view taken along a line indicated with arrows F—F shown in FIG. 12. The same elements as those shown in FIGS. 1 to 6 are given the same reference numerals and the same elements are omitted from description.

A cage assembling apparatus 61 according to this embodiment has a structure that the ball 5 is forcibly introduced into the pocket 7 from a position on the outside of the cage 3. The cage 3 according to this embodiment is joined to a base member (not shown) such that the cage 3 shown in FIG. 1 and positioned as shown in FIG. 1 is turned upside down. The base member (not shown) may be a member having substantially the same shape as that shown in FIG. 1. Note that the outer diameter of the support surface 17 is an outer diameter with which the support surface 17 can be received by the larger-diameter portion of the cage 3.

A rolling-element distributing column 63 of a cage assembling apparatus 61 has a cylindrical hollow portion 65 concentrically formed in the lower portion of the rolling-element distributing column 63. Therefore, the peripheral portion of the cylindrical hollow portion 65 is formed into a peripheral wall 67. A cut portion 69 formed by outwardly cutting the peripheral wall 67 in the radial direction is provided for the lower portion of the rolling-element distributing column 63. The cut surface of the cut portion 69 serves as a radial-directional pressing surface 71.

The rolling-element supply passage 29 which penetrates the rolling-element distributing column 63 in the axial direction is provided for the rolling-element distributing column 63. The rolling-element supply passage 29 has an inner diameter which is substantially the same as the outer diameter of the ball 5 to permit a plurality of the balls 5 to be loaded in a line. An end of the rolling-element supply passage 29 is opened in the upper surface of the rolling-element distributing column 63. Another end of the rolling-element supply passage 29 is opened as an opening 72 formed in the cut portion 69 of the lower surface of the rolling-element distributing column 63. That is, the ball 5 loaded in the rolling-element supply passage 29 is supplied to the cut portion 69 through the opening 72.

The lower surface of the rolling-element distributing column 63 is provided with an axial-directional pressing surface 75 formed into an inclined surface obtained by cutting a portion of a ceiling surface 73 of a cylindrical hollow portion 65 such that the cutting thickness is gradually enlarged toward the rolling-element supply passage 29.

The operation of the cage assembling apparatus 61 structured as described above will now be described.

Figure 14:
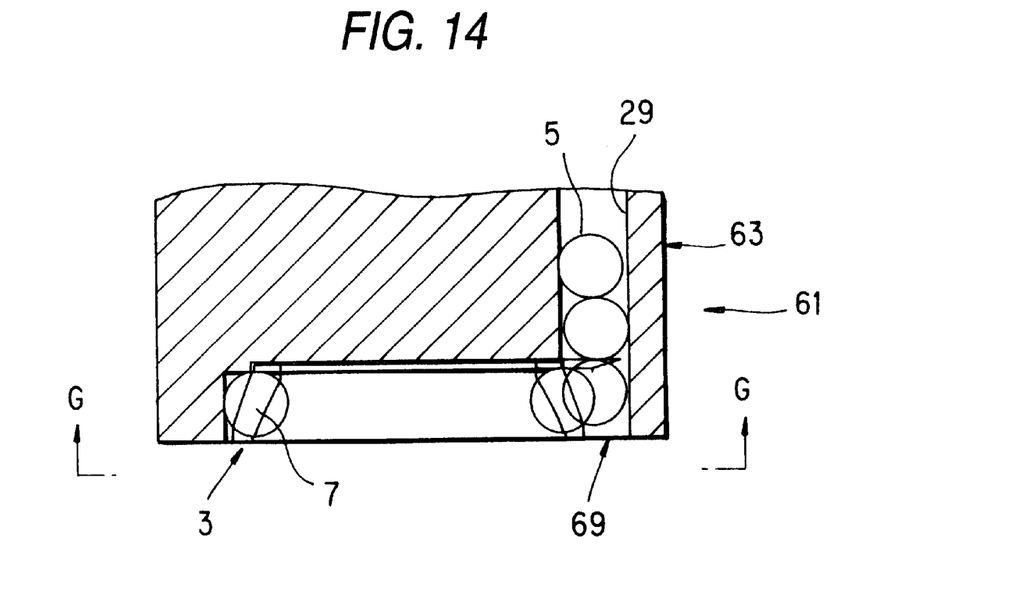
FIG. 14 is a side view showing a state of the cage assembling apparatus according to the second embodiment in which the ball is being installed.
Figure 15:
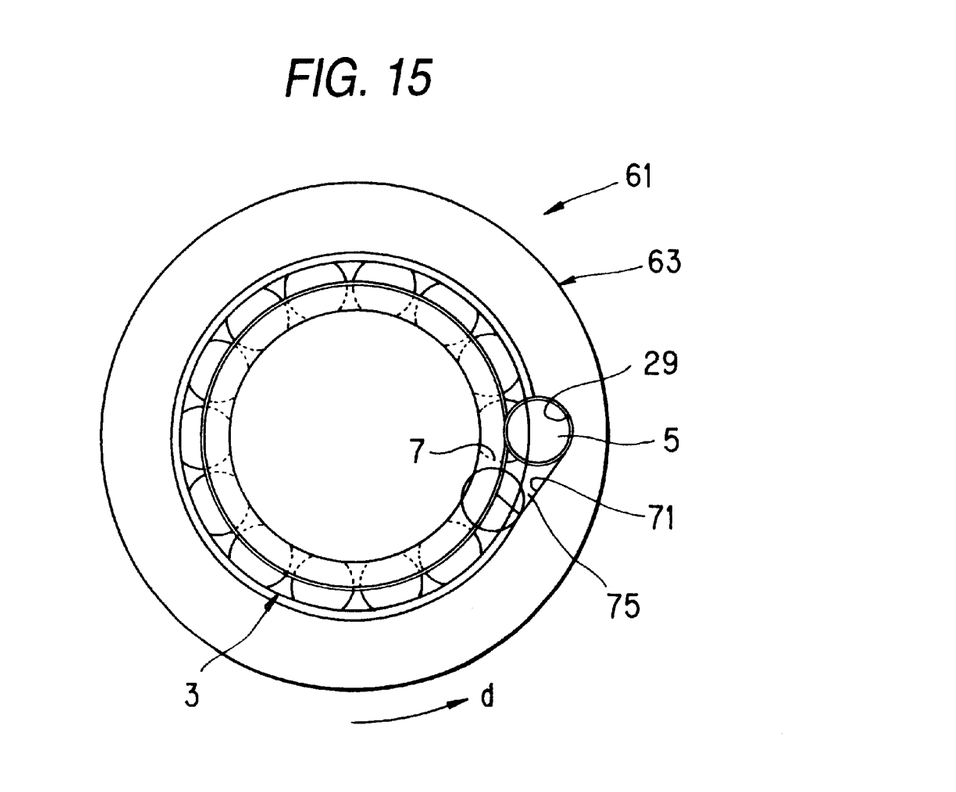
FIG. 15 is a cross sectional view taken along line indicated with arrows G—G shown in FIG. 14.

FIG. 14 is a side view showing a state of the cage assembling apparatus according to the second embodiment in which the balls are being installed. FIG. 15 is a cross sectional view taken along a line indicated with arrows G—G shown in FIG. 14.

The cage 3 is joined to the base member (not shown). The base member and the rolling-element distributing column 63 are engaged to each other. The balls 5, the number of which is the same as the number of the pockets 7, have been loaded in the rolling-element supply passage 29 of the rolling-element distributing column 63. Therefore, the lowest ball 5 has been brought to a state in which the ball 5 has been supplied to the cut portion 69.

When rotation of the motor 51 has been started in the foregoing state, the rolling-element distributing column 63 is rotated in a direction indicated with an arrow d. After the rolling-element distributing column 63 has been rotated, the ball 5 is pressed to the inside portion of the rolling-element distributing column 63 by the radial-directional pressing surface 71. Moreover, the ball 5 is downwardly pressed by the axial-directional pressing surface 75. As a result, the ball 5 elastically deforms the opening of the pocket 7 so that the diameter of the pocket 7 is enlarged. Therefore, the ball 5 is forcibly introduced into the pocket 7.

Since the lowest ball 5 is forcibly introduced into the pocket 7, a next ball 5 is dropped to the lowest portion. Then, the rolling-element distributing column 63 is rotated, the ball 5 similarly pressed against the radial-directional pressing surface 71 and the axial-directional pressing surface 75 is forcibly introduced into a next pocket 7. A similar operation is repeated and the rolling-element distributing column 63 is rotated one time so that all of the balls 5 are distributed to all of the pockets 7 so as to be installed.

Figure 16:
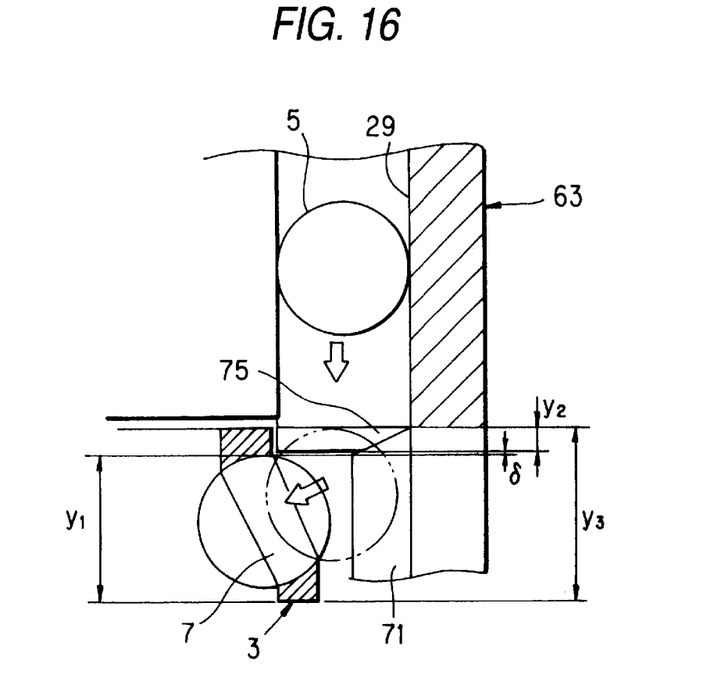
FIG. 16 is a diagram for defining the height of an axial-directional pressing surface.

The dimensional relationship between the radial-directional pressing surface 71 and the axial-directional pressing surface 75 with reference to FIGS. 16 to 19. As shown in FIG. 16, the height y2 of the axial-directional pressing surface 75 must be defined in such a manner as to contact with the ball 5 in a state where the ball 5 has been dropped (indicated with two-dot chain line), and to inhibit the contact of the ball 5 with the axial-directional pressing surface 75 after the ball 5 is forcibly introduced into the pocket 7. Therefore, assuming that y1: height of the top end of a ball held in the pocket from the upper surface of the base member, y2: height of the axial-directional pressing surface, y3: height of the top end of the ball from the upper surface of the base member when the ball has been placed on the opening of the pocket, δ: clearance (gap for preventing interference), y2 must be defined to satisfy equation (1) (y2≧y3−y1−δ).

Figure 17:
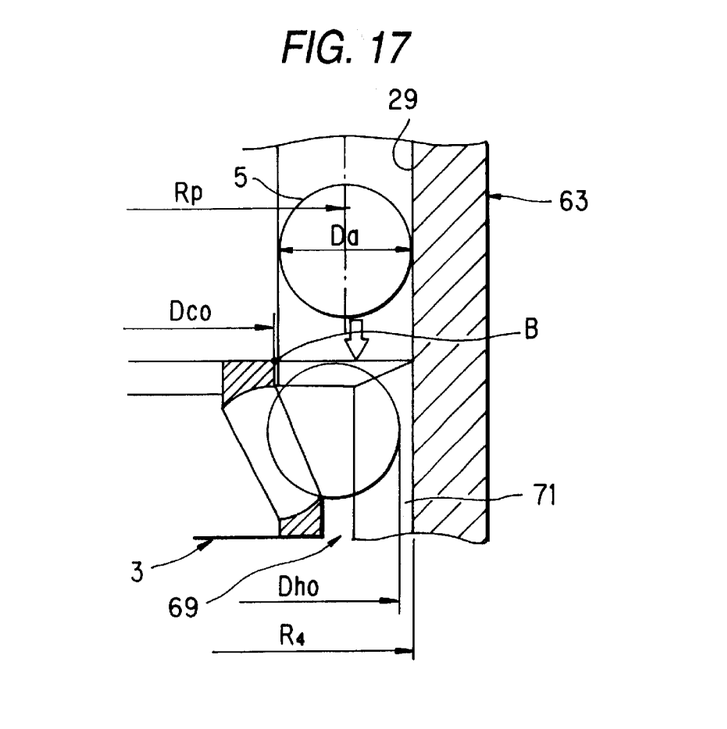
FIG. 17 is a diagram for defining the position of a rolling-element supply passage and a maximum radius of a radial-directional pressing surface.

As shown in FIG. 17, the rolling-element supply passage 29 must permit the ball 5 to smoothly be dropped without any contact with the upper end surface B of the cage 3. Therefore, assuming that Rp: radius of the center of the rolling-element supply passage Dco: diameter of upper end surface B Da: diameter of ball, Rp must be defined to satisfy the following relationship:

$$Rp \geq (Dco+Da)/2 \quad (6)$$

To permit the ball 5 to be dropped to the cut portion 69 as shown in FIG. 17, the maximum radius of the radial-directional pressing surface 71 is not smaller than a predetermined value. That is, when the maximum radius of the radial-directional pressing surface 71 is smaller than a predetermined value, the ball 5 cannot be dropped. Therefore, assuming that R4: maximum radius of the radial-directional pressing surface, Dho: circumscribed diameter of ball immediately before ball is brought into contact with pocket so as to forcibly be introduced, R4 must be defined to satisfy the following relationship:

$$R4 \geq Dho/2 \quad (7)$$

Figure 18:
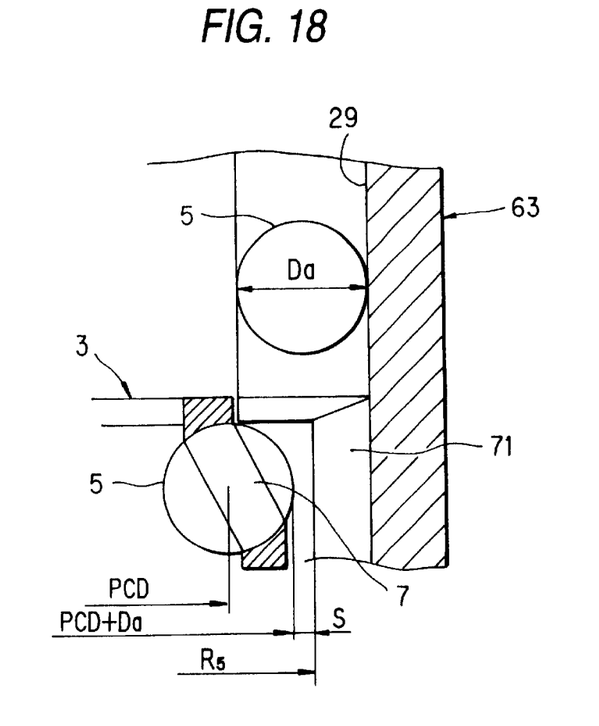
FIG. 18 is a diagram for defining a minimum radius of the radial-directional pressing surface.

As shown in FIG. 18, contact of the ball 5 held in the pocket 7 with the radial-directional pressing surface 71 must be inhibited when the rolling-element distributing column 63 has been rotated. It is preferable that gap s is maintained between the ball 5 and the radial-directional pressing surface 71 at this time. Therefore, assuming that R5: minimum radius (that is, the radius of peripheral wall 67) of the radial-directional pressing surface, PCD: distance between centers of balls held in pockets, R5 must be defined to satisfy the following relationship:

$$R_5 > (PCD+Da)/2 \quad (8)$$

Also in this embodiment, similarly to the first embodiment, even if the ball 5 is not forcibly introduced into the final position by the radial-directional pressing surface 71, the elastic force of the pocket 7 causes the ball 5 to be introduced into the pocket 7. That is, when the diameter portion of the ball 5 has allowed to pass through the opening of the pocket, the diameter of the opening of the pocket is reduced along the curved surface of the ball 5. Thus, the ball 5 is introduced into the pocket 7.

Figure 19:
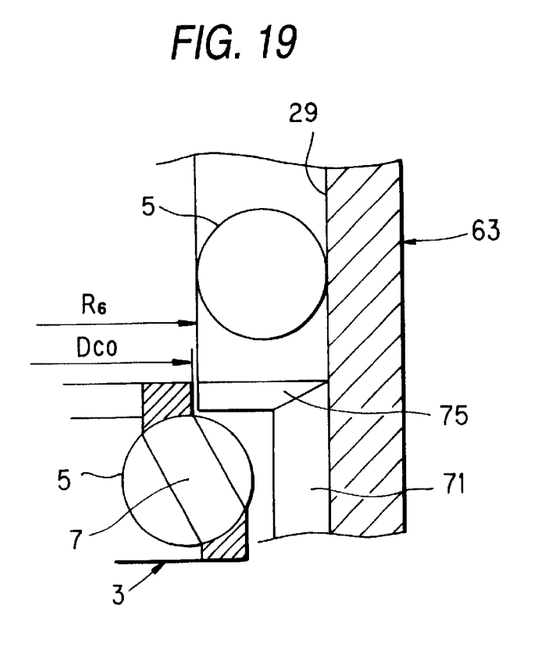
FIG. 19 is a diagram for defining a minimum radius of the axial-directional pressing surface.

As shown in FIG. 19, the axial-directional pressing surface 75 must continuously press the ball 5 for a predetermined period of time even after introduction of the ball 5 into the pocket 7 has been started and the ball 5 has been moved to the inside portion in the radial direction. Therefore, the minimum radius of the axial-directional pressing surface 31 must be not larger than a predetermined value. Therefore, assuming that R6: minimum radius of the axial-directional pressing surface, it is preferable that R6 is defined to satisfy the following relationship:

$$R6 > Dco/2 \quad (9)$$

As described above, the above-mentioned cage assembling apparatus 61 is arranged such that the rolling-element distributing column 63 is rotated. Thus, the ball 5 supplied through the rolling-element supply passage 63 is pressed by the radial-directional pressing surface 71 and the axial-directional pressing surface 75 so as to forcibly be introduced into the pocket 7 of the cage 3. The foregoing rotation causes the plural balls 5 to sequentially be installed in all of the pockets 7. Thus, distribution of the balls 5 to the plural pockets 7 and installation of the ball 5 to each pocket 7 which have individually been performed with the conventional structure can simultaneously be performed by only rotating the rolling-element distributing column 63. Therefore, the operation can be performed by only one motor 51. Moreover, the assembling cycle including the distribution step and the step for forcibly installing the balls 5 can considerably be shortened.

The first and second embodiments incorporating the cage 3 formed into the cone shape have been described. The cage assembling apparatus according to the present invention is able to install the balls 5 when the cage is formed into a cylindrical shape as shown in FIG. 20 or a crown shape as shown in FIG. 21.

Figure 20:
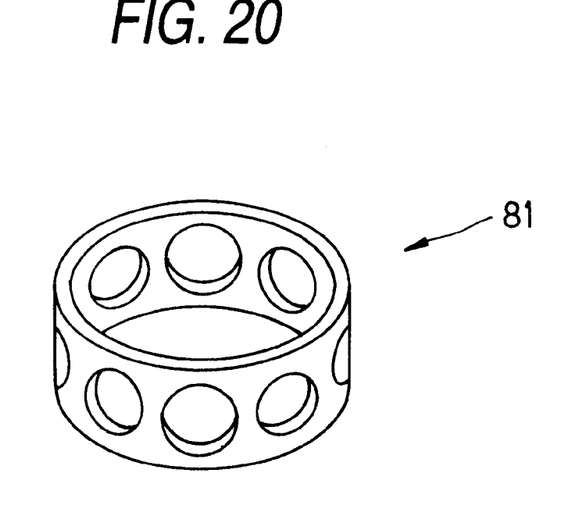
FIG. 20 is a perspective view showing a cylindrical cage.

In the foregoing case, a cage assembling apparatus for installing the ball 5 in a cage 81 shown in FIG. 20 is permitted to omit the axial-directional pressing surfaces 31 and 75. When the ball 5 is forcibly introduced from the inside portion of the cage 81, the rolling-element distributing column 13 according to the first embodiment and incorporating the radial-directional pressing surface 27 may be employed. When the ball 5 is forcibly introduced from the outside of the cage 81, the rolling-element distributing column 63 according to the second embodiment and incorporating the radial-directional pressing surface 71 may be employed.

Figure 21:
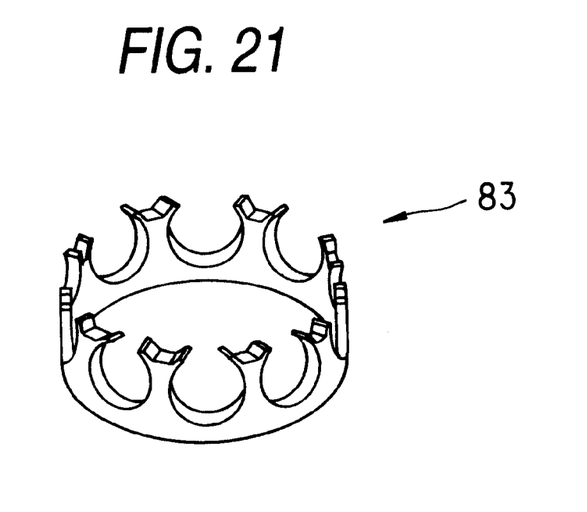
FIG. 21 is a perspective view showing a crown-shape cage.

A cage assembling apparatus for installing the ball 5 in the crown-shape cage 83 as shown in FIG. 21 is permitted to omit the radial-directional pressing surfaces 27 and 71. Thus, the rolling-element distributing column having only the axial-directional pressing surface 31 according to the first embodiment or the axial-directional pressing surface 75 according to the second embodiment may be used to press and install the ball 5 from a position above the cage 83.

The cage shown in FIGS. 20 and 21 may be assembled by using a rolling-element distributing column having both of the radial-directional pressing surface and the axial-directional pressing surface to reduce the number of types of the rolling-element distributing column so as to improve the general versatility.

Although each of the foregoing embodiments arranged such that the rolling elements are balls has been described, the cage assembling apparatus according to the present invention may be applied to a structure that the rolling elements are rollers (including conical rollers).

As described above, the cage assembling apparatus according to the present invention incorporates the base member for supporting a cage and a rolling-element distributing column which is capable of relatively rotating with respect to the base member, wherein the pressing surface for forcibly introducing rolling elements into pockets by using the relative rotation with respect to the base member is formed. Therefore, the distribution of the rolling elements and forcible introduction the rolling elements which have individually been performed can simultaneously be performed by only the rotation of the rolling-element distributing column. As a result, the operation of the cage assembling apparatus can be performed by only one motor. Therefore, the structure of the apparatus can be simplified. Moreover, the assembling cycle for forcibly introducing the rolling elements into the cage can considerably be shortened.

The present disclosure relates to the subject matter contained in Japanese patent application No. 10-370927 filed on Dec. 25, 1998 which is expressly incorporated herein by reference in its entirety.

What is claimed is:

1. A cage assembling apparatus for installing rolling elements in a plurality of pockets of a flexible cage, said pockets being provided in a circumferential direction of said cage and rollably holding said rolling elements, said cage assembling apparatus comprising:

a base member supporting said cage;

a rolling-element distributing column disposed concentrically to said cage supported to said base member and being relatively rotatable with respect to said base member, an end of said rolling-element distributing column faced to said cage being formed with an opening of a rolling-element supply passage for loading said rolling elements in a line; and a pressing surface including an axial-directional pressing surface and a radial-directional pressing surface, said axial-directional pressing surface being a first slant surface inclined in a direction which presses said rolling element faced to said pocket toward said pocket in an axial direction of said cage by relatively rotating said base member and said rolling-element distributing column, said radial-directional pressing surface being a second slant surface inclined in a direction which presses said rolling element opposed to said pocket toward said pocket in a radial direction of said cage by relatively rotating said base member and said rolling-element distributing column, said pressing surface forcibly introducing said rolling elements supplied through said opening into said pockets by relatively rotating said base member and said rolling-element distributing column, wherein said rolling elements are subjected to pressing forces in both of the axial direction and the radial direction of said cage.

2. A cage assembling apparatus according to claim 1, wherein said rolling elements, the number of which is the same as that of said pockets, are arranged on said rolling-element supply passage of said rolling-element distributing column.

3. A cage assembling apparatus according to claim 1, wherein said cage is one of a cage for an angular ball bearing, a cage for a crown-shaped ball bearing, a cage for a tapered roller bearing and a cage for a ball bearing.

4. A cage assembling method for installing rolling elements in a plurality of pockets of a flexible annular cage, said pockets being provided in a circumferential direction of said cage and rollably holding said rolling elements, said cage assembling method comprising the steps of:

supporting said cage to a base member;

arranging said rolling elements one by one from an opening of a rolling-element supplying device on said pocket opposing to said opening, while relatively and concentrically rotating said rolling-element supplying device with respect to said cage supported to said base member; and sequentially pressing said rolling elements in a desired positions of said pockets by a pressing surface formed in said opening by using the relative rotation between said base member and said rolling-element supplying device, wherein said pressing surface includes an axial-directional pressing surface and a radial-directional pressing surface, said axial-directional pressing surface being a first slant surface inclined in a direction which presses said rolling element faced to said pocket toward said pocket in an axial direction of said cage by relatively rotating said base member and said rolling-element distributing column, said radial-directional pressing surface being a second slant surface inclined in a direction which presses said rolling element opposed to said pocket toward said pocket in a radial direction of said cage by relatively rotating said base member and said rolling-element distributing column, and wherein said rolling elements are subjected to pressing forces in both of the axial direction and the radial direction of said cage.

\* \* \* \* \*